Figure 1:
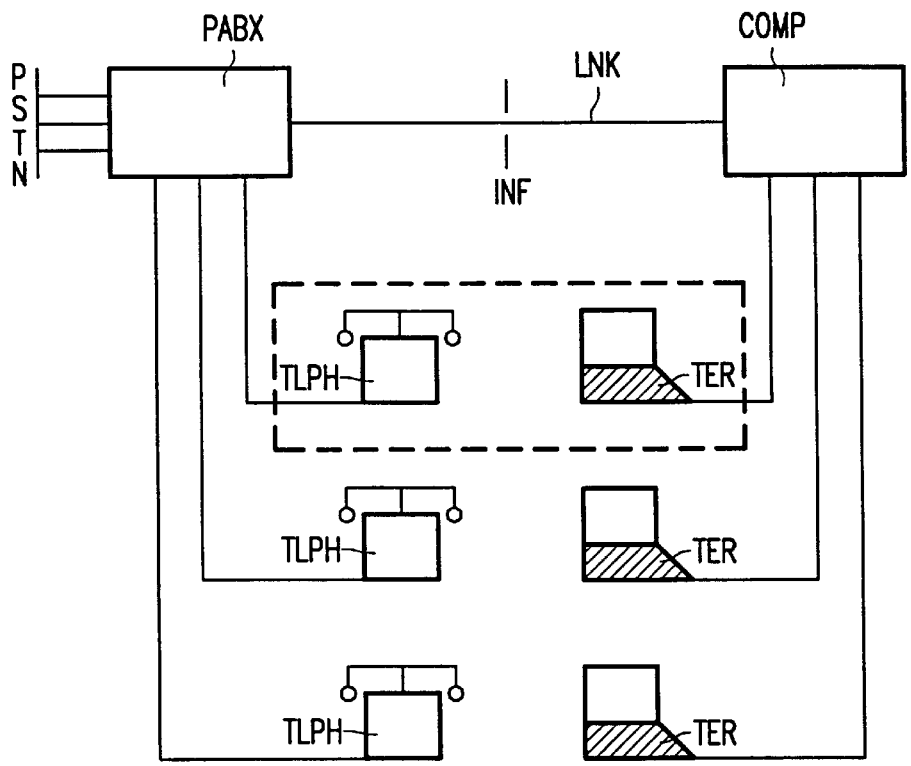

United States Patent
Oerlemans et al.

[11] Patent Number: 5,805,692
[45] Date of Patent: Sep. 8, 1998

[54] PRIVATE AUTOMATIC BRANCH EXCHANGE (PABX) SYSTEM WITH TRANSPARENT COMPUTER SUPPORTED TELECOMMUNICATIONS APPLICATIONS (CSTA) FUNCTIONALITY

[75] Inventors: Cornelis A. M. Oerlemans, Maarssen; Richard J. Sitters, Hilversum, both of Netherlands

[73] Assignee: U.S. Philips Corporation, New York, N.Y.

[21] Appl. No.: 856,025

[22] Filed: May 14, 1997

Related U.S. Application Data

[63] Continuation of Ser. No. 601,894, Feb. 15, 1996, abandoned.

[30] Foreign Application Priority Data

Feb. 28, 1995 [EP] European Pat. Off. .............. 95200490

[51] Int. Cl.[6] .............................. H04M 7/00; H04M 3/42; H04M 3/00
[52] U.S. Cl. .......................... 379/225; 379/207; 379/229; 379/269; 379/279
[58] Field of Search .................................... 379/201, 207, 379/224, 229, 230, 269, 279, 225; 455/403

[56] References Cited

U.S. PATENT DOCUMENTS

| 4,007,336 | 2/1977 | Hutton, Sr. | 379/224 |
| 4,313,036 | 1/1982 | Jabara | 379/67 |
| 4,488,004 | 12/1984 | Bogart et al. | 379/225 |
| 4,602,363 | 7/1986 | Das et al. | 379/225 |
| 4,723,272 | 2/1988 | Maat | 379/211 |
| 4,790,003 | 12/1988 | Kepley et al. | 379/142 |
| 5,249,222 | 9/1993 | Pinard | 379/220 |
| 5,550,906 | 8/1996 | Chau et al. | 379/207 |

OTHER PUBLICATIONS

"ECMA Standardizing Information and Communication Systems", Protocol for Computer Supported Telecommunications (CSTA) Phase I, Standard ECMA–180, Jun. 1992.

"ECMA Standardizing Information and Communication Systems", Services for Computer Supported Telecommunications Applications (CSTA) Phase I, Standard ECMA–179, Jun. 1992.

Gleinig et al., "CSTA–Computer Supported Telecommunications Applications", Nachrichtentechnik Elektronik, vol. 42, 1992, No. 3, pp. 96–98.

Maat, "Call Processing in a Fully Integrated Network of SOPHO–S2500 PABXs", Philips TDS Review, vol. 44, No. 3, Dec. 1986, pp. 32–45.

Primary Examiner—Harry S. Hong
Attorney, Agent, or Firm—Anne E. Barschall

[57] ABSTRACT

A telecommunications system includes a network of coupled telecommunication exchanges (PABX1, PABX2, PABX3). At least one of the exchanges is coupled to a processor (COMP) via a so-called Computer Telephony Interface (CTI). The exchanges monitor state information for extensions (TLPH1, TLPH2, TLPH3) that are connected to the exchanges. A router routes the state information to the exchange which is coupled to the processor. That exchange transfers the state information to the processor.

14 Claims, 4 Drawing Sheets

PRIVATE AUTOMATIC BRANCH EXCHANGE (PABX) SYSTEM WITH TRANSPARENT COMPUTER SUPPORTED TELECOMMUNICATIONS APPLICATIONS (CSTA) FUNCTIONALITY

This is a continuation of application Ser. No. 08/601,894, filed Feb. 15, 1996, now abandoned.

The invention relates to a telecommunication system comprising a first telecommunication exchange coupled to data processing means, which exchange is arranged for transferring state information about the state of extensions that can be connected to the telecommunication system to the data processing means.

Such a telecommunication exchange is known from the article "CSTA-Computer Supported Telecommunications Applications" by U. Gleinig, P. Redemann and L. Winkler, Nachrichtentechnik Elektronik, vol. 42 (1992), no. 3, pages 96–98. In this article a telecommunication system is described comprising a telecommunication exchange which is coupled via a so-termed Computer Telephony Interface (CTI) to data processing means, in this case formed by a single computer. This provides that the computer and the telecommunication exchange are each other's complement in the execution of a number of functions. To this end the telecommunication exchange transfers state information about the state of the extensions to the telecommunication exchange to the computer. The computer transfers manipulation instructions for manipulating connections between the extensions to the telecommunication exchange. In the system described in this article, the interface is a so-termed Computer Supported Telecommunications Applications (CSTA) interface. This interface is standardized by the European Computer Manufacturers Association (ECMA). However, there are also other standardized interfaces, such as the Telephony Server Application Programming Interface (TSAPI, Novell Trademark).

Companies having various branches often have a private branch exchange for each branch. They are mutually linked into a network. These private branch exchanges communicate with each other. A proprietary protocol typical of a specific company may then be used, which makes it possible that all the facilities supported by the local private branch exchange are also accessible to extensions connected to other exchanges of the network. As a result, the network of exchanges is manifested as a single exchange. In the cited article by U. Gleinig, P. Redemann and L. Winkler, no indication is given as to how state information of extensions connected to different telecommunication exchanges arranged in a network configuration can be transferred to the data processing means.

It is an object of the invention to provide a telecommunication system in which the state information of extensions connected to different telecommunication exchanges arranged in a network configuration is transferred to the data processing means.

For this purpose, a telecommunication system according to the invention is characterized in that the telecommunication system comprises at least a second telecommunication exchange coupled to the first telecommunication exchange, which second telecommunication exchange comprises monitoring means for acquiring state information about the state of extensions that can be connected to the second telecommunication exchange for the purpose of the data processing means, and routing means for routing the state information to the data processing means via the first telecommunication exchange. This means that only the first telecommunication exchange needs to be connected to the data processing means. By simply routing the state information from the extensions connected to the second telecommunication exchange and, if available, also from the extensions connected to further telecommunication exchanges, to the first telecommunication exchange, the first telecommunication exchange can transfer state information from extensions of a whole network to the data processing means.

An embodiment for the telecommunication exchange according to the invention is characterized in that the second telecommunication exchange comprises manipulation means for manipulating the extensions in response to manipulation instructions coming from the data processing means and in that the first telecommunication exchange comprises routing means for routing the manipulation instructions to the second telecommunication exchange. In consequence, the data processing means are capable of manipulating in a simple and fully transparent manner extensions that can be connected to the second telecommunication exchange, without themselves being connected to the second telecommunication exchange.

These and other aspects of the invention will be apparent from and elucidated with reference to the embodiments described hereinafter.

Figure 2:
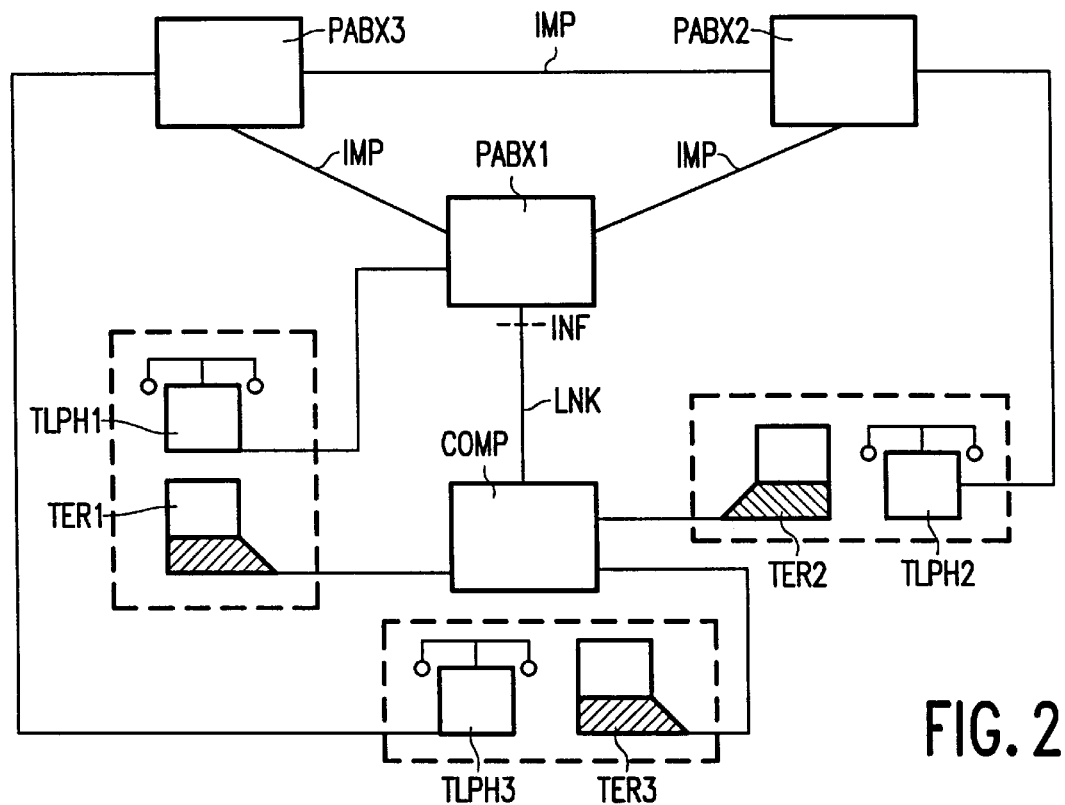
Figure 3:
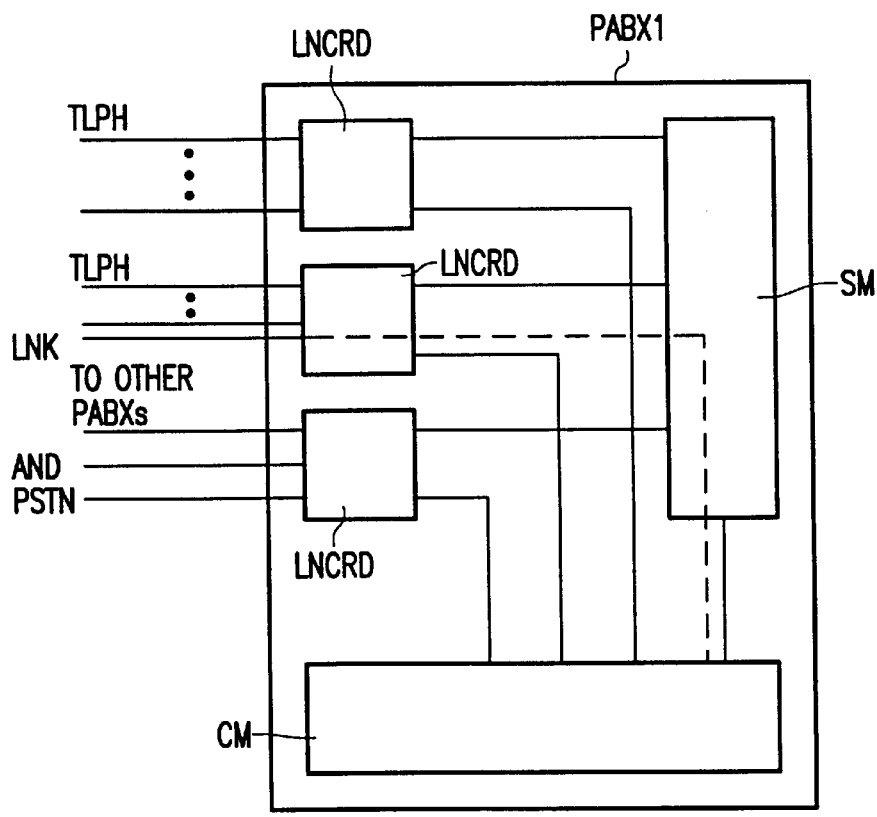
Figure 5:
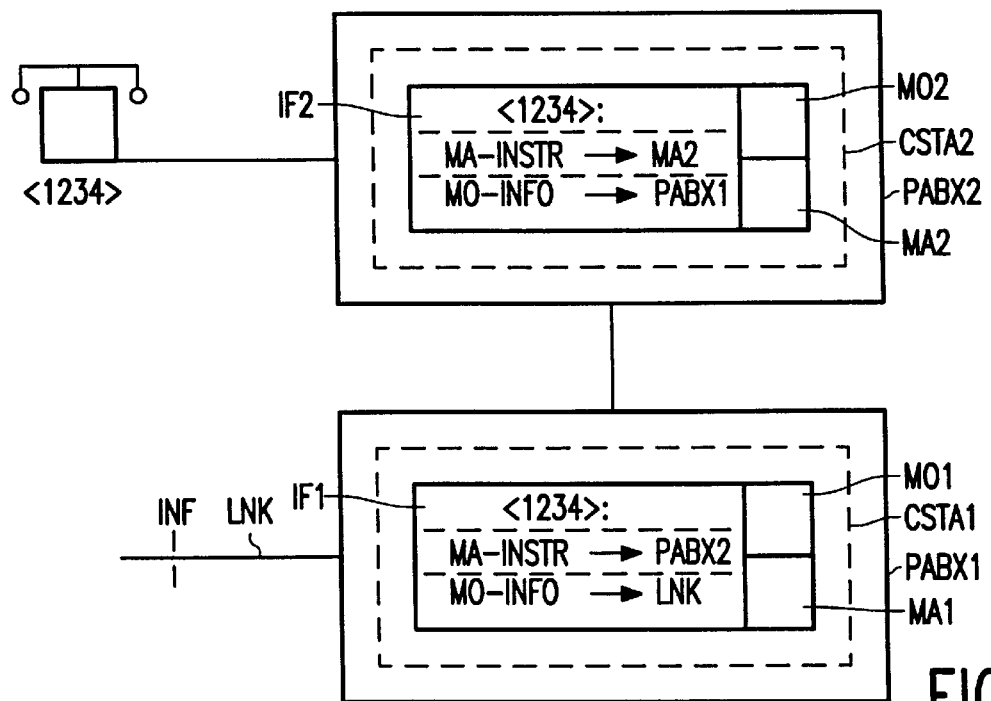
Figure 4:
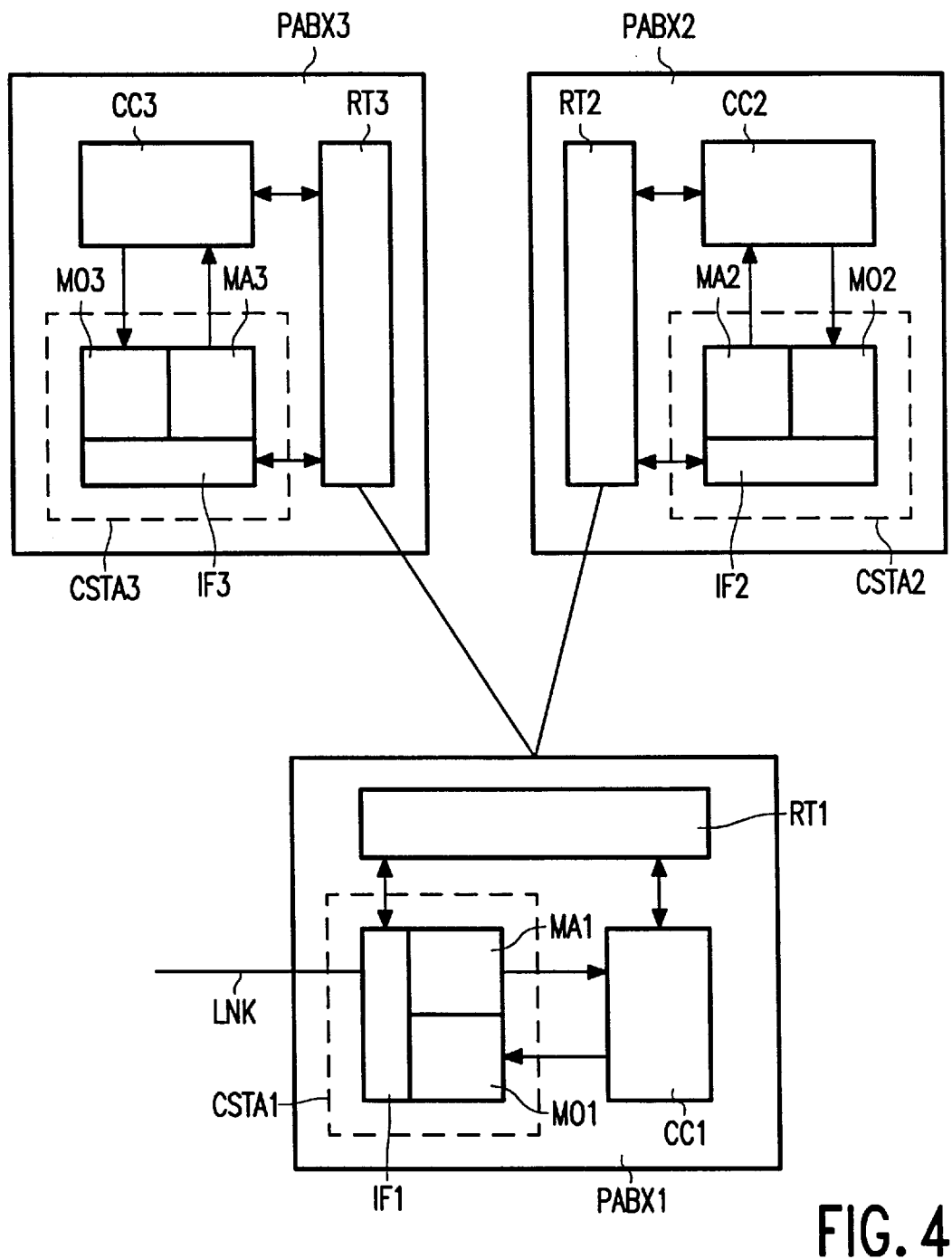
Figure 6:
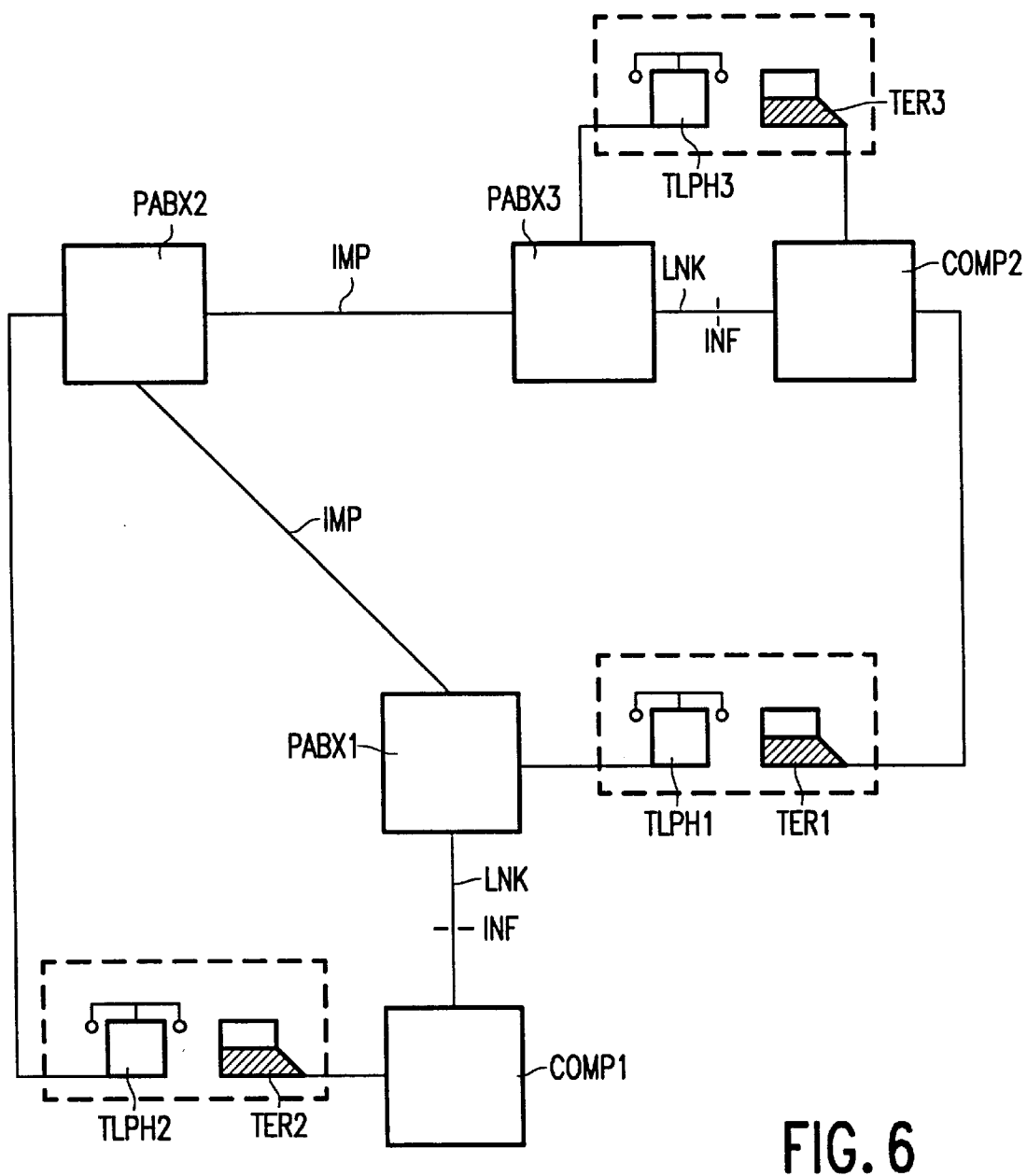

In the drawings:

FIG. 1 shows a block diagram of a known telecommunication system comprising a telecommunication exchange and data processing means, FIG. 2 shows a block diagram of a first embodiment for a telecommunication system according to the invention, FIG. 3 shows a block diagram of a telecommunication exchange, FIG. 4 shows in detail the control modules of the telecommunication exchanges, FIG. 5 shows an extension connected to a telecommunication exchange and monitored via a link to another telecommunication exchange, and FIG. 6 shows a block diagram of a second embodiment for a telecommunication exchange according to the invention.

FIG. 1 shows a block diagram of a known telecommunication system as described in the article by Gleinig, Redemann and Winkler. The system comprises a single Private Automatic Branch Exchange PABX and data processing means COMP. The data processing means are formed here by a single computer, but may also be formed by a plurality of workstations connected to a local network. The telecommunication exchange is connected to the Public Switched Telecommunication Network PSTN. The exchange comprises a number of internal lines to which extensions TLPH are connected. These extensions may be analog, digital or cordless telephones, but also facsimile machines, and so on. The telecommunication exchange is connected to the computer via link LNK. Messages are exchanged between the exchange and the computer via this link. The link forms the interface INF between the telecommunication exchange and the computer. There are various standards of this interface, such as, the Telephony Server Application Programming Interface (TSAPI, Novell Trademark) standard, and the Computer-Supported Telecommunications Applications (CSTA) standard. The semantics and the syntax of the CSTA-messages are standardized by the ECMA (European Computer Manufacturers Association) as described in ECMA standards 179 and 180. Terminals TER are connected to the computer. The terminals TER and the end stations TLPH of the same user belong together. This is shown diagrammatically by a dashed line around an end station and a terminal. The use of both terminal and end station provides a large number of additional facilities to the user, as described in cited article.

FIG. 2 shows a block diagram of a first embodiment for a telecommunication system according to the invention. The telecommunication system comprises a network formed by three telecommunication exchanges PABX1, PABX2, PABX3 and data processing means COMP. The telecommunication exchanges mutually communicate while making use of a proprietary protocol IMP. As a result, all facilities supported by a single exchange (such as, for example, automatic ringback) can also be presented to lines between extensions which are connected to different telecommunication exchanges. As regards such facilities, the extensions do not see any difference between a line to another extension that is connected to its own exchange and a line to another extension that is connected to another exchange in the network. With respect to this type of facilities the network is manifested as a single telecommunication exchange. Such a network of telecommunication exchanges is described in the article "Call Processing in a Fully Integrated Network of SOPHO-S2500 PABXs" by J.Ph. Maat, pp. 32–45, Philips TDS Review, vol. 44, no. 3, December 1986.

Only the first telecommunication exchange PABX1 is connected to the computer via a link LNK. The telecommunication system shown in the drawing has a CSTA-interface. However, the invention may also be applied to telecommunication systems which utilize different-standard interfaces. End stations TLPH1,TLPH2,TLPH3 are connected to the various telecommunication exchanges. Terminals TER1,TER2,TER3 are connected to the computer. The terminals TER1,TER2,TER3 belong to the respective end stations TLPH1,TLPH2,TLPH3. This is shown in a diagram by a dashed line around an end station and a terminal.

The data processing means can monitor and manipulate extensions in the whole network in a manner to be described in the following, without the need for having more than one link between the network of telecommunication exchanges and the data processing means. Thus, in the direction of the data processing means, the network of exchanges behaves like a single exchange.

FIG. 3 shows a block diagram of a telecommunication exchange as used in the invention. The telecommunication exchange is formed by a plurality of line cards LNCRD, a switch module SM and control module CM. The subscriber lines as well as lines for coupling the telecommunication exchange to the public switched telecommunication network PSTN and lines for coupling the telecommunication exchange to other telecommunication exchanges in a network configuration are connected to the line cards. All kinds of end stations, both digital and analog, can be connected to the subscriber lines. The control module comprises control software for setting up and controlling the lines. The control module is coupled via a line card to a subscriber line LNK for exchanging ECMA-standardized messages with the computer.

FIG. 4 shows in detail the control modules of the telecommunication exchanges in the telecommunication system as shown in FIG. 2. The telecommunication exchanges each comprise call control means CC1,CC2,CC3. These call control means control inter-extension lines. Furthermore, the call control means initiate transferring signals to the extensions, such as the engage signal, and process input information coming from the extensions such as, going on-hook, going off-hook, dialling, and so on. The call control means use a proprietary call state model. This model defines a finite number of states a line between two extensions can be in.

Furthermore, the telecommunication exchanges comprise CSTA-control means CSTA1,CSTA2,CSTA3. These control means monitor which CSTA links are connected to which telecommunication exchanges in the network; they monitor which end stations in the network are CSTA monitored and monitor the CSTA state of these end stations. Furthermore, they provide the mapping of the ECMA-standardized CSTA-call state model on the proprietary call state model. For these two models are different.

The CSTA control means CSTA1,CSTA2,CSTA3 are formed by the following sections:

an interface section IF1,IF2,IF3, a monitoring section MO1,MO2,MO3, and a manipulation section MA1,MA2,MA3.

The monitoring section provides obtaining state information about extensions connected to the monitoring section's own exchange, which in CSTA leads to a call event report to the data processing means. This section then provides the mapping of the proprietary call state model on the CSTA call state model. The manipulation section transforms incoming manipulation instructions, called Switching Function Services in CSTA, for manipulating extensions connected to the manipulation section's own exchange into stimuli to be understood by the call control means, after which the call control means provide the eventual manipulation of the extension. The interface section operates as an interface between the CSTA link and the monitoring and manipulation section. It provides furthermore that state information and manipulation instructions are taken to the right spot in the network. For this purpose, the interface section contains the following information:

to which exchanges are CSTA-monitored extensions connected, via which CSTA link does the monitoring and manipulation of these extensions take place.

Using this information, the interface section transfers, as required, manipulation instructions and state information to an interface section in another exchange. This transfer is physically effected by routing means RT1,RT2,RT3. These routing means also provide the routing of non-CSTA related messages between the telecommunication exchanges.

FIG. 5 shows the monitoring and manipulation via a link connected to a telecommunication exchange of an extension connected to another telecommunication exchange. The extension connected to the second telecommunication exchange and carrying number 1234 is monitored and manipulated via a CSTA link connected to the first telecommunication exchange. The interface section of CSTA control means CSTA1 of the first telecommunication exchange contains address information which indicates that manipulation instructions intended for manipulating extension 1234 are to be transferred to the second telecommunication exchange. The interface section of the second telecommunication exchange contains address information which indicates that the manipulation instructions for extension 1234 are to be sent to the manipulation section MA2 of this exchange. Furthermore, the interface section IF2 contains address information which indicates that state information about the state of extension 1234 is to be sent to the first telecommunication exchange. The interface section present in this exchange contains address information which indicates that the state information belonging to extension 1234 is to be sent to the data processing means COMP via link LNK. It makes no difference to the monitoring and manipulation sections whether an extension is monitored via a link not connected to its own exchange or via a link that is connected to its own exchange. This means that the monitoring and manipulation sections can be arranged similarly in all the exchanges.

FIG. 6 shows a block diagram of a second embodiment for a telecommunication system according to the invention. In addition to the already described telecommunication exchanges PABX1,PABX2,PABX3, there are two computers COMP1,COMP2 present. The first computer COMP1 is connected to the first telecommunication exchange PABX1 via a CSTA interface INF. The second computer COMP2 is connected to the third telecommunication exchange PABX3 via a CSTA interface INF. Between the first and third exchanges there is no direct connection. The end stations TLPH1,TLPH3 connected to the first and third exchanges are monitored by the second computer, while the state information and the manipulation instructions of the end station connected to the first exchange are sent via the second exchange which in that case acts as a transit exchange between the first and third exchanges. This is possible, because the routing means RT1,RT2,RT3 of each exchange are arranged for mutually sending messages between the exchanges along the shortest route. The end station TLPH2 connected to the second exchange is monitored by the first computer. Thus, it is not necessary for end stations connected to an exchange, which has also a CSTA link, to be monitored via this link itself. By adapting the address information in the interface section of the CSTA control means, stations of the whole network can be monitored via any CSTA link. This provides that the telecommunication system according to the invention can easily be adapted to changed the circumstances.

We claim:

1. A telecommunication system comprising
   a. data processing means from any exchanges (COMP),
   b. a first telecommunication exchange (PABX1) coupled to the data processing means (COMP),
   c. at least a second telecommunication exchange (PABX2) coupled to the first telecommunication exchange (PABX1), which second telecommunication exchange (PABX2) comprises
      I. monitoring means (MO2) for acquiring state information about the state of extensions (TLPH2) that can be connected to the second telecommunication exchange (PABX2), the state information being for use by the data processing means (COMP), and
      ii. routing means (IF2, RT2) for routing the state information to the data processing means via the first telecommunication exchange (PABX1),
so that the entire system has CSTA functionality, and so that the division between the first and second exchanges is transparent from the point of view of the CSTA functionality, the term "CSTA" herein being an abbreviation for Computer Supported Telecommunications Application.

2. A telecommunication system as claimed in claim 1, wherein
   the second telecommunication exchange (PABX2) comprises manipulation means (MA2) for manipulating the extensions (TLPH2) in response to manipulation instructions coming from the data processing means (COMP) and
   the first telecommunication exchange (PABX1) comprises routing means (IF1,RT1) for routing the manipulation instructions to the second telecommunication exchange (PABX2).

3. The system of claim 1, wherein the routing means uses addressing information for directing the state information toward the data processing means.

4. The system of claim 1 wherein the data processing means processes state information of the second exchange even though the data processing means is only directly connected to the first exchange.

5. The exchange of claim 4 wherein the routing means uses address information for directing the state information from the data processing means.

6. The exchange of claim 5, wherein the routing means allows the data processing means to communicate state information to the further exchange even though the data processing means is only directly connected to the exchange.

7. The exchange of claim 4, wherein
   the state information is of a format usable by the data processing means after conversion by the CSTA functionality and
   the routing means allows the state information to be routed via voice lines of the PABX.

8. The system of claim 1 wherein
   the state information is of a format usable by the data processing means after conversion by the CSTA functionality and
   the routing means allows the state information to be routed via voice lines of the PABX.

9. The system of claim 1 comprising at least one further data processing means, wherein the routing means allows the entire system to have a CSTA functionality with respect to which divisions between exchanges is transparent.

10. A telecommunication exchange (PABX2) comprising
    a. monitoring means (MO2) for obtaining state information about the state of extensions (TLPH2) connectable to the telecommunication exchange (PABX2), the state information being for use in data processing means (COMP), which data processing means is functionally separate from any exchange, and
    b. routing means (IF2,RT2) for routing the state information to a further telecommunication exchange (PABX1) that can be coupled to the telecommunication exchange (PABX2), the further exchange being arranged for transferring state information to the data processing means,
so that any system containing the exchange has CSTA functionality, and so that the division between the exchange and any such further exchange is transparent from the point of view of the CSTA functionality, the term "CSTA" herein being an abbreviation for Computer Supported Telecommunications Applications.

11. The exchange of claim 10, wherein the routing means uses addressing information for directing the state information toward the data processing means.

12. The exchange of claim 11, wherein the routing means enables the data processing means to process state information of the exchange even though the data processing means is functionally separate from the exchange.

13. The exchange of claim 10, wherein
    the state information is of a format usable by the data processing means after conversion by the CSTA functionality and
    the routing means allows the state information to be routed via voice lines of the PABX.

14. A telecommunication exchange (PABX1) arranged for receiving extension-manipulation instructions from data processing means (COMP), said data processing means being functionally separate from any exchange, characterized in that the telecommunication exchange (PABX1) comprises routing means (IF1,RT1) for routing the manipulation instructions to a further telecommunication exchange (PABX2), so that any system containing the exchange and the further exchange has CSTA functionality, and so that the division between the exchange and any such further exchange is transparent from the point of view of the CSTA functionality, the term "CSTA" herein being an abbreviation for Computer Supported Telecommunications Application.

* * * * *